Dec. 23, 1947.　　T. J. HOY　　2,433,319
JOURNAL LUBRICATING DEVICE
Filed Jan. 18, 1943　　2 Sheets-Sheet 1
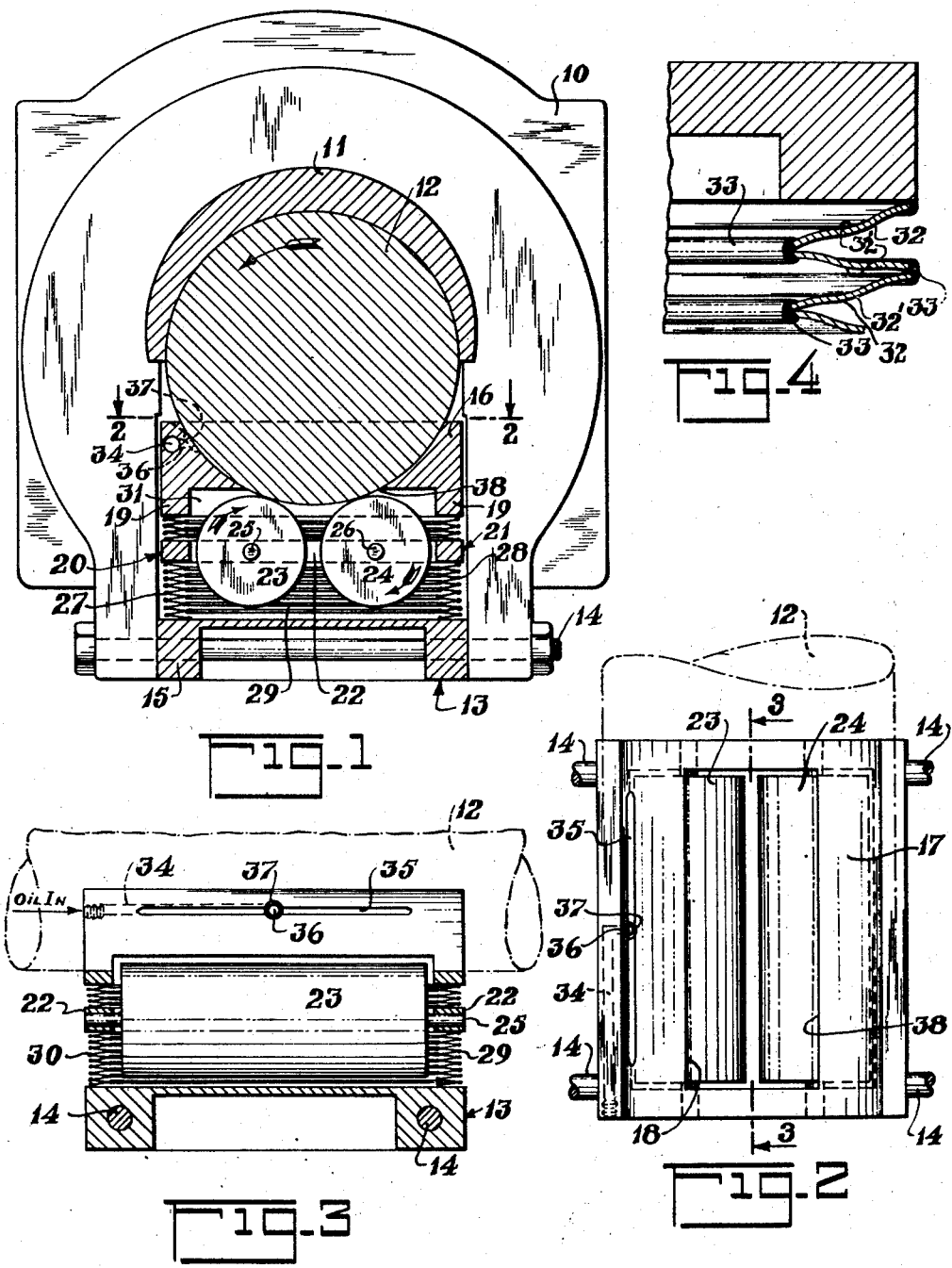
INVENTOR
Thomas J. Hoy.
BY
ATTORNEY Dec. 23, 1947.     T. J. HOY     2,433,319
JOURNAL LUBRICATING DEVICE
Filed Jan. 18, 1943     2 Sheets-Sheet 2
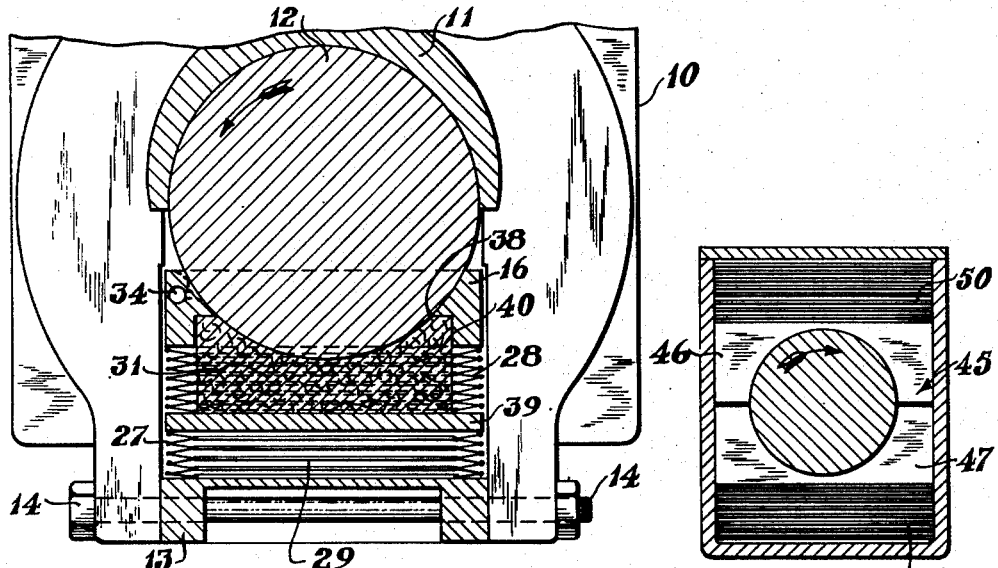
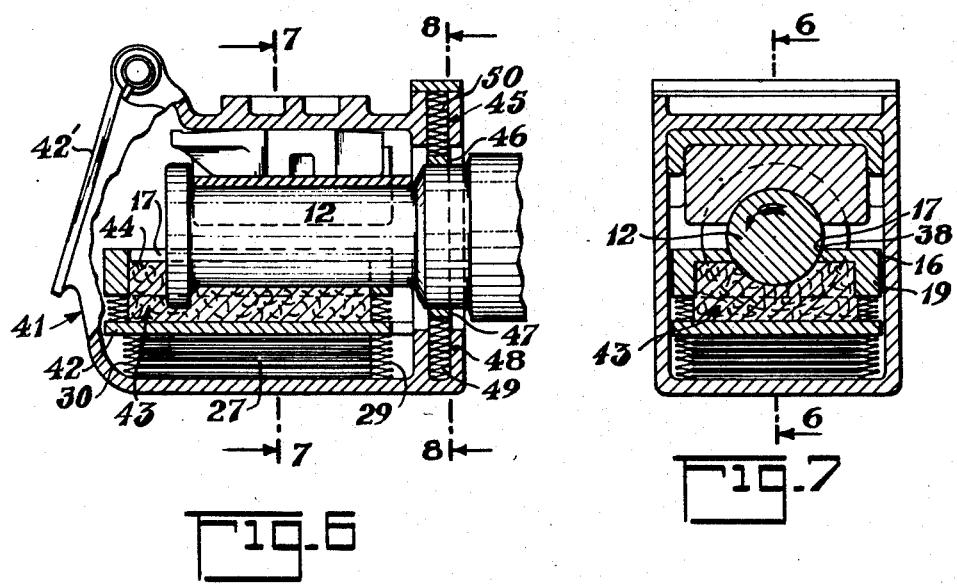
INVENTOR
Thomas J. Hoy.
BY
ATTORNEY Patented Dec. 23, 1947

2,433,319

UNITED STATES PATENT OFFICE 2,433,319

JOURNAL LUBRICATING DEVICE

Thomas J. Hoy, Newark, N. J.

Application January 18, 1943, Serial No. 472,652

10 Claims. (Cl. 308—83)

1

This invention relates to apparatus for lubricating the journal of an axle and more particularly for lubricating the journals of a locomotive driver, railway car axle, or the like.

The present invention provides a lubricator by means of which a constant and even lubrication of the journal is maintained. This invention is particularly adaptable for use in cooperation with the driver journals of locomotives where, due to the high speed and great tonnage of present day locomotives, lubrication at all times is essential. The construction and arrangement of the lubricating apparatus of this invention is such that the lubricating means is enclosed and protected from dust and other foreign particles.

This invention will be understood from the following description when considered in connection with the accompanying drawings forming a part thereof and in which:

Fig. 1 is a side elevational view of a driving box embodying the present invention partly in transverse section;

Fig. 2 is a plan view taken on the line 2—2 of Fig. 1;

Fig. 3 is a longitudinal sectional view taken on the line 3—3 of Fig. 2;

Fig. 4 is an enlarged sectional view of the pressure exerting means of the device of Fig. 1;

Fig. 5 is a view similar to Fig. 1 but of another form of the invention;

Fig. 6 is a longitudinal sectional view of the invention as used in conjunction with the journal box of a railway car, tender, or the like;

Fig. 7 is a sectional view taken on the line 7—7 of Fig. 6, and

Fig. 8 is a sectional view taken on the line 8—8 of Fig. 6.

Like characters of reference refer to like parts throughout the several views.

Referring to the forms of the invention shown in Figs. 1 to 5, the reference numeral 10 designates the driving box of a locomotive which has a crown brass bearing 11 for the journal 12 of an axle. The journal box has a removable cellar box 13 held in position by bolts 14. The cellar box comprises a rectangular shaped bottom plate 15 through which the bolts 14 pass, and a top plate 16 also rectangular in shape and of substantially the same dimensions as the bottom plate. The top surface of plate 16 is curved inwardly at 17 at a radius substantially the same as the radius of the journal 12. The central portion of the curved surface has a longitudinal recess 18 so positioned that when the top plate 16 is positioned in operative relationship with respect to the journal 12 a portion of the peripheral surface of the journal 12 will project through the recess and the curved surface of the top plate will engage the journal surface at opposite sides of the recess. The top plate 16 has a marginal projection 19 which projects downwardly toward the bottom plate 15. An intermediate support 20 having opposite side pieces 21 and opposite end pieces 22 is positioned substantially intermediate the top and bottom plates of the cellar box. The end pieces and side pieces are in substantial vertical alignment with the marginal projection 19 of the top plate 16. Two horizontally spaced rollers 23 and 24 extend longitudinally of the intermediate support. The rollers 23 and 24 are secured respectively to axles 25 and 26 which project from opposite ends of the rollers and are rotatably mounted in the opposite end pieces 22 of the intermediate member so that a portion of the surface of the rollers are beneath the recess.

The intermediate support is held in position in relation to the top and bottom plates of the cellar box by resilient side and end members which exert sufficient force when the cellar box is in position in the journal box to maintain the curved portion of the top plate 16 and the periphery of the rollers 23 and 24 in constant contact with the peripheral surface of the journal 12. The side members 27 and 28 and the end members 29 and 30 are each divided into an upper and a lower section by the intermediate support 20. The lower section of the opposite side members 27 and 28 extend longitudinally of the bottom plate 15 and are secured thereto at the bottom thereof in a fluid-tight manner, as for example by welding, adjacent the side edges of said plate. The lower section of the side members 27 and 28 are secured respectively to the under surface of the opposite side pieces 21 of the support 20 in a fluid-tight manner. The upper section of the opposite side members 27 and 28 are attached in a fluid-tight manner at the bottom, to the upper surface of the opposite side pieces 21 of the intermediate member 20 and secured at the top in a fluid-tight manner to the sides of the marginal projection 19 of the top plate 16. The lower section of the end members 29 and 30 is secured at the bottom thereof in a fluid-tight manner to the opposite ends respectively of the bottom plate 15 and extend transversely thereof. At the top, the lower section of the ends 29 and 30 is secured in a fluid-tight manner respectively to the under surface of the opposite end pieces 22 of the intermediate support 20. The upper section of the opposite end members is attached in a fluid-tight manner at the bottom to the upper surface of the opposite end pieces 22 of the member 20 and secured at the top in a fluid-tight manner to the ends of the marginal projection 19 at the top plate 16. Opposite ends of the side members 27 and 28 are secured in a fluid-tight manner, as for example by welding, to the ends of the end members 29 and 30 adjacent thereto. An oil reservoir 31 is thereby formed in the cellar box 13.

The side members 27 and 28 and the end members 29 and 30, as shown more particularly in Fig. 4, are each formed of a series of superimposed leaves 32, each leaf being connected by welding 33 along opposite longitudinal edges to the adjacent longitudinal edge of the adjacent leaves to thereby form a plurality of flexible hinges. Alternate leaves 32 are spaced from one another. Leaves 32 are of resilient metal and are reversely curved as indicated at 32'. The side and end members are therefore of resilient construction with the flexure, since the leaves are reversely curved, equally distributed throughout the leaf and not confined to the point of connection between the leaves. The resiliency of the side and end members is such that when the cellar box 13 is mounted in the driving box 10 and the bolts 14 are placed in position to hold the cellar box in place, the resiliency of the side and end members exerts a constant upward force on plate 16 sufficient to firmly hold the curved surface of the upper plate in contact with peripheral surface of the journal 12. In this manner, the oil reservoir 31 is sealed against the leakage of fluid at the top thereof. Since the side and end members are secured in a fluid-tight manner in relation to each other and the bottom, intermediate, and top plates of the cellar 13, oil in the reservoir cannot leak therefrom. The pressure exerted by the side and end members on the plate is substantially equal on both sides and both ends of the plate so that the curved surface of the top plate and the peripheral surface of the journal are held constantly in engagement by an even pressure throughout the entire area of engagement. The upward pressure of the lower section of the resilient side and end members is sufficient to constantly hold the peripheral surface of the rollers 23 and 24 firmly in contact with the peripheral surface of the journal.

The upper plate 16 has an oil passage 34 extending longitudinally from one end to substantially the center thereof. The oil passage 34 is adapted to be connected to an oil line, not shown, through which oil or other lubricant is supplied to the passage. A slot 35 is formed in the curved surface of the top plate 16 adjacent the passage 34 and is in communication with said passage through a hole 36. The surface of the top plate 16 is bevelled at 37 around the hole 36. The slot 35 extends longitudinally of the curved surface 17 to points short of both ends thereof.

In operation, a lubricant such as oil is fed into the passage 34 and enters the slot 35 through the hole 36. Lubricant in the slot 35 passes into contact with the peripheral surface of the journal 12, a film of oil being deposited on the peripheral surface of the journal as it rotates, as shown, in a counter-clockwise direction. Any excess lubricant is deposited in the reservoir 31. The normal level of the lubricant in the reservoir is such that at least the bottom portion of the rollers 23 and 24 is immersed therein. Counter-clockwise rotation of the journal 12 causes the rollers 23 and 24 to rotate in a clockwise direction through contact of the peripheral surface of the journal with the peripheral surface of the rollers 23 and 24. Rotation of the rollers 23 and 24 in lubricant in the reservoir 31 causes a film of lubricant to be deposited on the surface of said rollers and transmitted to the peripheral surface of the journal. Further rotation of the journal causes the surface thereof to pass into contact with the curved surface of the top plate 16 after passing in contact with the rollers. Any excess oil on the surface of the journal is removed at the edge 38 of the curved surface since the peripheral surface of the journal and the curved are constantly held in firm contact. The excess lubricant returns to the reservoir 31 and a thin film of lubricant is retained on the surface of the journal. With the construction of the present invention, a thin film of lubricant is at all times supplied between the peripheral surface of the journal 12 and the surface of the bearing 11 and also between the peripheral surface of said journal and the curved surfaces of the top plate 16. Should the supply of lubricant to the surface of the journal 12 through the passage 34, hole 36, and slot 35 for any reason be interrupted or stopped, the journal would be lubricated from the reservoir 31 by rotation of the rollers 23 and 24. Lubrication of the journal at a plurality of points, and the construction and arrangement of the cellar box of the present invention wherein the bearing surfaces are resiliently held firmly in contact with the journal under a constant, even pressure, assures an even distribution of lubricant between the bearing surface and the journal surface at all times.

In the form of the invention illustrated in Fig. 5, the rollers 23 and 24 and their intermediate supporting member 20 are omitted. An intermediate rectangular-shaped plate 39 is used instead of the supporting member 20 to which plate the upper and lower sections of the side members 27 and 28 and the upper and lower sections of the end members 29 and 30 are secured in a fluid-tight manner. The space within the side and end members and between the top plate 16 and the intermediate plate, which comprises the reservoir 31, is filled with cotton or wool waste 40 which contacts the peripheral surface of the journal 12 and is held in constant contact therewith by the action of the resilient side and end members. The operation of this form of the invention is substantially the same as the operation of the form of the invention of Figs. 1 to 4. Excess lubrication supplied to the surface of the journal 12 through the passage 34, hole 36 and slot 35 is wiped from the surface by the waste 40 as the journal rotates, as shown, in a counter-clockwise direction. The excess lubrication is wiped from the journal surface by the waste, which normally has some lubricant therein, and is retained in the reservoir 31. A thin film of lubricant is retained on the surface of the journal as it passes through the waste assuring a film of lubricant between the journal surface and the curved surface of the top plate 16 and between the journal and the surface of the bearing 11 at all times. Should the supply of lubricant to the journal surface through the passage 34 for any reason cease, the journal surface would be supplied with lubricant from the reservoir 31 by contact with the waste 40.

In Figs. 6 to 8, the invention is shown embodied in a journal box placed outside the wheel, for example, on a railway car journal. In this form of the invention, the bottom of the lower sections of the end members 29 and 30 and the side members 27 and 28 are secured to the bottom of a journal box 41 having a lid 42'. The top of the end and side members are secured to a rectangular-shaped intermediate plate 42 which extends longitudinally beyond the end of the journal 12. The bottom of the upper section of the end and side members is secured in a fluid-tight manner to the plate 42 and at the top are likewise secured to the marginal projection 19 of the top plate 16. The top plate 16 has a curved surface 17 and a recess 18 similar to the top plate of the form of the invention of Figs. 1 to 4, except that in the form of the invention shown in Figs. 6 to 8 the recess 18 is widened to accommodate the collar on the journal 12 from a point adjacent the collar at the end of the journal 12 to the end of the top plate nearest the collar. The curved surface 17 engages the periphery of the journal from a point adjacent its axle end to a point adjacent the collar. A reservoir 43 is formed between the side and end members and the top plate 16 and the intermediate plate 42 which reservoir is filled with waste 44 saturated with lubricant. The waste is pressed into contact with the circumferential surface of the journal 12 by the force exerted by the lower section of the side members 27 and 28 and the lower section of the end members 29 and 30 while the upper section of the side and end members exert an upward force which holds the curved surface 17 of the top plate 16 in firm contact with the surface of the journal. The journal from a point adjacent its axle end to a point adjacent the collar extends through the recess 18 in the top plate. In operation, as the journal turns, the surface thereof is lubricated by the lubricant in the waste 44 which is forced into contact with the surface of the journal by the lower section of the resilient side and end members of the cellar box. The end of the journal is lubricated by the waste in the portion of the reservoir beyond the end of the journal. Contact of the curved surface 17 with the peripheral surface of the journal causes excess lubricant, which does not pass the edge of the recess 18, to return to the waste 44 in the reservoir 31.

The end of the journal box adajcent the axle is closed by an end member 45 which comprises an upper member 46 and a lower member 47 adapted to abut one another at one end. The upper and lower members are both recessed at said one end to each embrace one-half of the journal firmly when the remainder of the end of the members are in abutment. The member 47 has a resilient portion 48 formed similarly to the side members 27 and 28 and end members 29 and 30 of the cellar box, the resilient portion 48 being formed of a series of superimposed leaves 49, the ends of one of said leaves being welded at opposite ends thereof to the end of the next adjacent leaf. Similarly, the member 46 has a similar resilient portion 50. The resilient portions 48 and 50 are each carried in a slot in the journal box, the end of the resilient member 50 bearing against the top of the journal box while the end of the resilient member 48 bears against the bottom of the journal box. The resiliency of the members 48 and 50 is such that when they are positioned in the journal box, the members 46 and 47 are held firmly together and against the peripheral surface of the journal preventing dust or foreign material from entering the journal box at the adjacent end but at the same time permitting axial or vertical movement of the journal as well as rotation thereof.

Although the invention has been disclosed in connection with a journal box for lubricating the journals of a locomotive driver and railway car journal, it will be appreciated that its use is not limited to this particular application, but that it is capable of application generally for the lubrication of journals or axles.

Inasmuch as changes may be made in the form, location and relative arrangement of the several parts of the invention without departing from the principles thereof, it will be understood the invention is not to be limited, excepting by the scope of the appended claims.

What is claimed is:

1. A journal lubricating device having lubricating means comprising a cellar box having a top member with spaced concave surfaces adapted to engage the peripheral surface of the journal, the surfaces being so spaced that a portion of said peripheral surface extends through the space into the box, resilient side members, resilient end members and a bottom member constructed and arranged to form a fluid-tight box, said resilient side and end members acting upon said top member to hold the concave surfaces thereof in engagement with the surface of the journal, lubricating means in the box resiliently held in contact with the portion of the journal surface extending into the box to transmit a lubricant thereto, and means for introducing a lubricant between the peripheral surface of the journal and a portion of the top member in engagement therewith at a point in advance of the last-mentioned lubricating means in the direction of rotation of said journal.

2. A journal lubricating device having lubricating means comprising a cellar box adapted to contain a lubricant said box having a top member with spaced surfaces adapted to engage the peripheral surface of the journal, the surfaces being so spaced that a portion of said peripheral surface extends through the space into the box, resilient side members, resilient end members and a bottom member constructed and arranged to form a fluid-tight box, said resilient side and end members acting upon the top member to hold said spaced surfaces thereof in engagement with the peripheral surface of the journal, and lubricating means comprising spaced rollers rotatably mounted in said box and resiliently held in frictional engagement with the portion of the peripheral surface of the journal extending into the box to be rotated by said engagement with the journal, said rollers being adapted to engage the lubricant in said box and transmit the same to the surface of the journal.

3. A journal lubricating device having lubricating means comprising a cellar box adapted to contain a lubricant, said box having a top member with spaced surfaces extending axially of the journal and engaging the peripheral surface of the journal, the surfaces being so spaced that a portion of said peripheral surface extends through the space and into the box, resilient side members, resilient end members and a bottom member constructed and arranged to form a fluid-tight box, said resilient side and end members acting upon said top member to hold the surface thereof in engagement with the surface of the journal, lubricating means in the box comprising an absorbent packing material, and a plate member mounted intermediate the top and bottom member to be acted upon by said resilient members and to thereby hold the packing material in engagement with the portion of the surface of the journal extending into the box and lubricate said portion.

4. A journal lubricating device having lubricating means comprising a cellar box having a top member with a surface adapted to engage the peripheral surface of the journal, said top member having a slot therethrough disposed so that a portion of the peripheral surface extends through the slot into the box, resilient side members, resilient end members and a bottom member constructed and arranged to form a fluid-tight box, said resilient side and end members acting upon said top member to hold the surface thereof in engagement with the surface of the journal, and lubricating means in the box resiliently held in contact with the portion of the journal surface extending into the box to transmit lubricant thereto.

5. A journal lubricating device having lubricating means comprising a cellar box having a top member with spaced surfaces adapted to engage the peripheral surface of the journal, the surfaces being so spaced that a portion of said peripheral surface extends through the space into the box, resilient side members, resilient end members and a bottom member constructed and arranged to form a fluid-tight box, said resilient side and end members acting upon said top member to hold the surfaces thereof in engagement with the surface of the journal, and lubricating means in the box resiliently held in contact with the portion of the journal surface extending into the box to transmit lubricant thereto.

6. A journal lubricating device having lubricating means comprising a cellar box adapted to contain a lubricant, said box having a top member with spaced surfaces extending axially of the journal and engaging the peripheral surface of the journal, the surfaces being so spaced that a portion of said peripheral surface extends through the space and into the box, resilient side members, resilient end members and a bottom member, said side and end members being constructed of a plurality of leaves of flexible material disposed in superimposed relationship to one another, each leaf being connected at opposite longitudinal edges thereof to an adjacent longitudinal edge of the adjacent leaves to thereby form a plurality of flexible hinges, the alternate leaves of said superimposed leaves being spaced from one another, the side and end members and the bottom member being constructed and arranged to form a fluid-tight box, said resilient side and end members acting upon the top member to hold the surface thereof in engagement with the surface of the journal, lubricating means in the box comprising an absorbent packing material, and packing supporting means disposed in the box to be acted upon by said resilient members and to thereby hold the packing material in engagement with the portion of the surface of the journal extending into the box and lubricate said portion.

7. A journal lubricating device having lubricating means comprising a cellar box adapted to contain a lubricant, said box having a top member with spaced surfaces extending axially of the journal and engaging the peripheral surface of the journal, the surfaces being so spaced that a portion of said peripheral surface extends through the space and into the box, resilient side members, resilient end members and a bottom member constructed and arranged, to form a fluid-tight box, said resilient side and end members acting upon said top member to hold the surface thereof in engagement with the surface of the journal, lubricating means in the box comprising an absorbent packing material, and packing supporting means disposed in the box to be acted upon by said resilient members and to thereby hold the packing material in engagement with the portion of the surface of the journal extending into the box and lubricate said portion.

8. A journal lubricating device having lubricating means comprising a cellar box having resilient side members, resilient end members and a bottom member, said side and end members being constructed of a plurality of leaves of flexible material disposed in superimposed relationship to one another, each leaf being connected along opposite longitudinal edges thereof to an adjacent longitudinal edge of the adjacent leaves to thereby form a plurality of flexible hinges, alternate leaves of said superimposed leaves being spaced from one another, the side and end members and the bottom member being arranged to form a fluid-tight box, a top member for said box with spaced surfaces adapted to engage the peripheral surface of the journal, the surfaces being so spaced that a portion of the peripheral surface extends through the space into the box, said top member being acted on by the resilient members so that the surfaces thereof are held in engagement with the peripheral surface of the journal, and lubricating means in the box resiliently held in contact with the portion of the journal surface extending into the box to transmit a lubricant thereto.

9. A journal lubricating device having lubricating means comprising a cellar box having resilient side members, resilient end members and a bottom member, said side and end members being constructed of a plurality of leaves of metal disposed in superimposed relationship to one another, each leaf being connected along opposite longitudinal edges thereof to an adjacent longitudinal edge of the adjacent leaves to thereby form a plurality of flexible hinges, alternate leaves of said superimposed leaves being spaced from one another, the side and end members and the bottom member being arranged to form a fluid-tight box, a top member for said box with spaced concave surfaces adapted to engage the peripheral surface of the journal, the surfaces being so spaced that a portion of the peripheral surface extends through the space into the box, and lubricating means comprising spaced rollers rotatably mounted in said end members and resiliently held in frictional engagement by said resilient members with the portion of the peripheral surface of the journal extending into the box to be rotated by engagement with the journal, said rollers being adapted to engage the lubricant in said box and transmit the same to the surface of the journal.

10. A journal lubricating device having lubricating means comprising a cellar box having resilient side members, resilient end members and a bottom member, said side and end members being constructed of a plurality of leaves of flexible material disposed in superimposed relationship to one another, each leaf being connected along opposite longitudinal edges thereof to an adjacent longitudinal edge of the adjacent leaves to thereby form a plurality of flexible hinges, alternate leaves of said superimposed leaves being spaced from one another, the leaves being reversely bent transversely thereof, the side and end members and the bottom member being arranged to form a fluid-tight box, a top member for said box with spaced surfaces adapted to engage the peripheral surface of the journal, the surfaces being so spaced that a portion of the peripheral surface extends through the space into the box, said top member being acted on by the resilient members so that the said surface thereof is held in engagement with the peripheral surface of the journal, and lubricating means in the box resiliently held in contact with the portion of the journal surface extending into the box to transmit a lubricant thereto.

THOMAS J. HOY.

REFERENCES CITED

The following references are of record in the file of this patent:

UNITED STATES PATENTS

| Number | Name | Date |
|---|---|---|
| 1,470,739 | Holmes | Oct. 16, 1923 |
| 1,298,311 | Dornan | Mar. 25, 1919 |
| 2,123,654 | McCormick | July 12, 1938 |
| 87,777 | Hubbard | Mar. 16, 1869 |
| 389,368 | Dupont | Sept. 11, 1888 |
| 1,245,586 | Hennessy | Nov. 6, 1917 |
| 1,253,036 | Holmes | Jan. 8, 1918 |
| 1,451,222 | Holtorp | Apr. 10, 1923 |
| 434,983 | Glover | Aug. 26, 1890 |
| 638,985 | Patten | Dec. 12, 1899 |
| 2,110,243 | Savage | Mar. 8, 1938 |

FOREIGN PATENTS

| Number | Country | Date |
|---|---|---|
| 815,471 | France | Apr. 12, 1937 |